United States Patent
Brooks et al.

(10) Patent No.: US 10,970,152 B2
(45) Date of Patent: Apr. 6, 2021

(54) NOTIFICATION OF NETWORK CONNECTION ERRORS BETWEEN CONNECTED SOFTWARE SYSTEMS

(71) Applicant: INTERNATIONAL BUSINESS MACHINES CORPORATION, Armonk, NY (US)

(72) Inventors: Michael D. Brooks, Southhampton (GB); Simon P. Rachman, Hampshire (GB); Jeremy Weaving, Romsey (GB); Andrew Wright, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 86 days.

(21) Appl. No.: 15/818,796

(22) Filed: Nov. 21, 2017

(65) Prior Publication Data
US 2019/0155673 A1 May 23, 2019

(51) Int. Cl.
*G06F 11/07* (2006.01)

(52) U.S. Cl.
CPC ........ *G06F 11/079* (2013.01); *G06F 11/0709* (2013.01); *G06F 11/0751* (2013.01); *G06F 11/0772* (2013.01); *G06F 11/0784* (2013.01)

(58) Field of Classification Search
CPC .............. G06F 11/079; G06F 11/0709; G06F 11/0772; G06F 11/0751
USPC ........................................................ 714/57
See application file for complete search history.

(56) References Cited

U.S. PATENT DOCUMENTS

| | | | |
|---|---|---|---|
| 8,042,004 B2 | 10/2011 | Ing et al. | |
| 9,137,101 B2 | 9/2015 | Keesara et al. | |
| 9,710,122 B1* | 7/2017 | Pillay | G06F 3/048 |
| 2006/0126495 A1 | 6/2006 | Guichard et al. | |
| 2007/0253329 A1* | 11/2007 | Rooholamini | H04Q 3/54558 370/220 |
| 2008/0056142 A1 | 3/2008 | Arnold et al. | |
| 2008/0117806 A1* | 5/2008 | Xu | H04J 3/14 370/217 |
| 2009/0257345 A1* | 10/2009 | King | H04L 41/22 370/216 |
| 2011/0194403 A1* | 8/2011 | Sajassi | H04L 12/462 370/217 |

(Continued)

*Primary Examiner* — Yair Leibovich
(74) *Attorney, Agent, or Firm* — Cantor Colburn LLP; Noah Sharkan

(57) ABSTRACT

Method and system are provided for notification of network connection errors between connected software systems. The method includes providing an error notification process for a local software system that uses one or more network connections to interact with a remote software system, wherein the error notification process includes a configuration of a selection of one or more error notification paths and enabling the error notification process that remains dormant and monitors the one or more network connections. The method detects an error in a network connection and invoking the error notification process, including: gathering information and building an error notification message; and sending the error notification message to the remote software system at the end of the network connection on which the error is detected via one or more error notification paths selected according to the configuration.

18 Claims, 8 Drawing Sheets

(56) References Cited

U.S. PATENT DOCUMENTS

| | | | |
|---|---|---|---|
| 2013/0279326 A1* | 10/2013 | Dunne | H04L 41/5025 370/228 |
| 2013/0301810 A1* | 11/2013 | Dunne | H04L 65/80 379/32.01 |
| 2015/0063096 A1 | 3/2015 | Huang | |
| 2016/0182363 A1* | 6/2016 | Li | H04L 45/22 709/223 |
| 2016/0196177 A1 | 7/2016 | Chamberlain et al. | |

* cited by examiner

NOTIFICATION OF NETWORK CONNECTION ERRORS BETWEEN CONNECTED SOFTWARE SYSTEMS

BACKGROUND

The present invention relates to notification of network connection errors between connected software systems and, more specifically, to notification between one software system and a partner software system that share the connection that is in error.

Many software products make use of network connections to distribute work between system images. Some of these network connections are long-lived, remaining active for hours or days at a time. Problem resolution for errors in the software components that access a network are difficult for service teams to handle in a timely manner, as they often require diagnostic information to be collected from the software systems at both ends of a connection at the time the error occurs.

Typically, an error is detected by one software system, which then collects the diagnostic information, while the partner software system at the other end of the connection fails to realize that an error has occurred. A software service team may then need to ask for the error condition to be recreated and then for data to be manually collected from the partner system when the primary system detects the error. This situation is far from ideal as the pair of systems may be located on different software stacks, or in separate data centers, or even in systems under the control of different organizations.

It would be helpful to the service team if the systems could be configured to notify each other that a specific error had been detected and diagnostics are needed at both ends of the connection. This is not straightforward as the error may prevent one system of notifying its partner that action is needed.

The notification of another system of an error needs to take place as soon as the error is detected, so that data collected from each system contains a record of what happened at the time of the error or very soon after it.

SUMMARY

According to an aspect of the present invention there is provided a computer-implemented method for notification of network connection errors between connected software systems, comprising: providing an error notification process for a local software system that uses one or more network connections to interact with a remote software system, wherein the error notification process includes a configuration of a selection of one or more error notification paths; enabling the error notification process that remains dormant and monitors the one or more network connections; and detecting an error in a network connection and invoking the error notification process, including: building an error notification message; and sending the error notification message to the remote software system at the end of the network connection on which the error is detected via one or more error notification paths selected according to the configuration.

The method may include providing an error handling process including: monitoring error notification messages arriving over one or more network connections from a remote software system; determining if a current error notification message is a duplicate of a previously received error notification message in a predefined time period; and gathering problem diagnostic information if a current message is not a duplicate.

According to another aspect of the present invention there is provided a system for notification of network connection errors between connected software systems, comprising: a processor and a memory configured to provide computer program instructions to the processor to execute the function of the defined components; a connection error notification component for a local software system that uses one or more network connections to interact with a remote software system, wherein the connection error notification component includes a configuration component for configuration of a selection of one or more error notification paths; an enabling component for enabling the connection error notification component that remains dormant and has a connection monitoring component for monitoring the one or more network connections; and a connection error detection component for detecting an error in a network connection and a notification invoking component for invoking further operation of the connection error notification component, including: an error notification message building component for building an error notification message; and a notification sending component for sending the error notification message to the remote software system at the end of the network connection on which the error is detected via one or more error notification paths selected by a path configuring component according to the configuration.

The system may include a connection error handling component including: an error notification message monitoring component for monitoring error notification messages arriving over one or more network connections from a remote software system; a new message determining component for determining if a current error notification message is a duplicate of a previously received error notification message in a predefined time period; and a diagnostic gathering component for gathering problem diagnostic information if a current message is not a duplicate.

According to another aspect of the present invention there is provided a computer program product for notification of network connection errors between connected software systems, the computer program product comprising a computer readable storage medium having program instructions embodied therewith, the program instructions executable by a processor to cause the processor to: provide an error notification process for a local software system that uses one or more network connections to interact with a remote software system, wherein the error notification process includes a configuration of a selection of one or more error notification paths; enable the error notification process that remains dormant and monitors the one or more network connections; and detect an error in a network connection and invoking the error notification process, including: building an error notification message; and sending the error notification message to the remote software system at the end of the network connection on which the error is detected via one or more error notification paths selected according to the configuration.

The computer program product may include causing the processor to: provide an error handling process including: monitoring error notification messages arriving over one or more network connections from a remote software system; determining if a current error notification message is a duplicate of a previously received error notification message in a predefined time period; and gathering problem diagnostic information if a current message is not a duplicate

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

Figure 1:
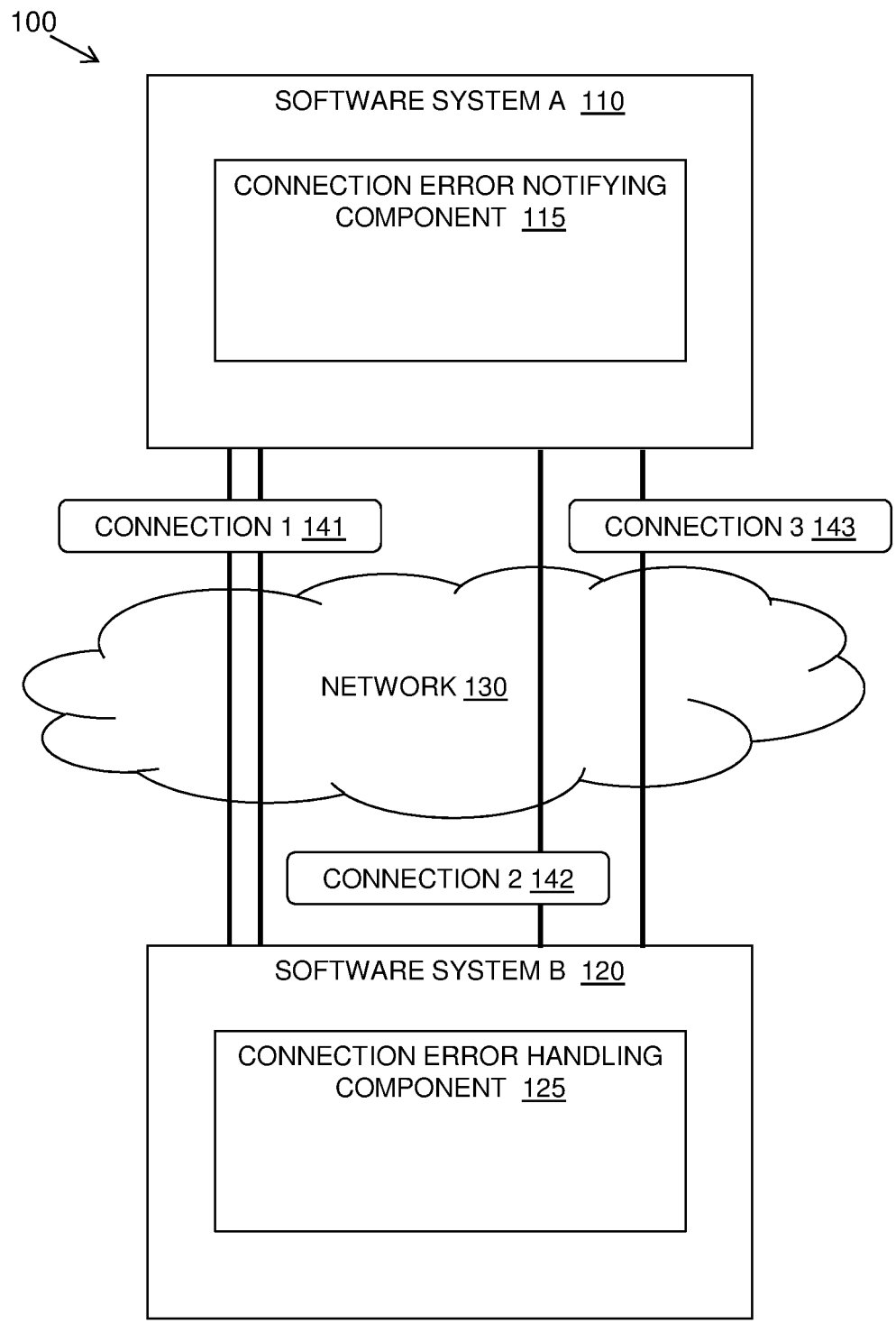
FIG. 1 is a schematic diagram of an example system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and system are described for notification of network connection errors between one software system and a partner software system that share the connection that is in error. To achieve this end the local software system has the ability to select from one or more connections to send an error notification message over.

The method and system provide a means of sending an error notification message to a partner system when an error is detected with the connection between the local system and its partner. There may be more than one path for a network communication link to send the error notification message over and, therefore, the method and system may provide a mechanism to select one or more of the paths.

An error notification message is a message that may be sent from one software system to another software system asking the other software system to perform an action. In one embodiment, the error notification message may be a "request for diagnostic information" collection message. Attempting to send this message may encounter the network error, in which case another path is required to the partner software system.

The error may be at one of the software systems either side of the network connection or in the network connection between the software systems. Problem resolution for errors in the software systems requires diagnostic information to be collected from the software systems at both ends of a connection at the time the error occurs. Error diagnostic request messages are therefore sent at the time of the error from a software system detecting the error to a partner software system.

The software systems may be identical or may be different software products that make use of a common network protocol to connect to each other. In one embodiment, the software systems may be software images of a distributed software system. In one example, the software system may be a transaction server using distributed computing. The diagnostic information may include diagnostic data, logs and other information required to determine a cause of a network connection error.

The described method sends an error notification message from a first software system to a partner software system in an interconnected software system for collecting error diagnostic information by dynamically determining possible connection paths between the interconnected software systems. The method may follow configured rules of dynamic path selection.

At the partner software system, an aspect of the described method extends to preventing processing of multiple error notification messages for the same error received via multiple paths to the partner software system in the interconnected system using an algorithm.

Referring to FIG. 1, a schematic diagram illustrates a networked system 100 in which the described method may be provided. A first software system A 110 and a second software system B 120 represent software systems in a networked system 100 in which work may be distributed between the software systems 110, 120.

The software systems 110, 120 may make use of network connections 141, 142, 143 across a network 130 to distribute work between the software systems and/or for use in sending error notification messages. Some of these network connections may be long-lived and remaining active for hours or days at a time, whilst others may be short-lived connections.

Software system A 110 may be configured with a connection error notifying component 115. This may be a long-lived process that can be configured to monitor available connections 141, 142, 143 and attempt to notify an associated partner software system of an error by a configured path or set of paths. The connection error notifying component 115 may determine the most suitable connection path 141, 142, 143 for use as a communication link between the software systems 110, 120 to deliver the diagnostic request message.

Software system B 120 may be configured with a connection error handler component 125 that may be called by means of any of the connections 141, 142, 143 to causes diagnostic collection to be initiated at software system B 120. The connection error handler component 125 may send back a response to the first software system A 110 indicating that diagnostic processing is being carried out or including the diagnostic information. The software system B 120 may alternatively send the diagnostic information to another party as indicated in the diagnostic request message.

It will be appreciated that a single software system may include the functionality of both the connection error notifying component 115 and the connection error handling component 125 in order to act as either an instigator of an error diagnostic request or a collector of error diagnostic information.

In FIG. 1, there are three connections 141, 142, 143 shown as examples of possible network connections. In this example scenario, the first connection 141 may be a long-lived Transmission Control Protocol/Internet Protocol (TCP/IP) connection that makes use of two separate sockets. A connection of this type may have only one path or may have more than two paths. It illustrates how a failure in one path may be reported over another path on the same connection.

The second and third connections 142, 143 show that additional error paths may be configured using other connection types. For example, the second connection 142 may be a System Network Architecture (SNA) connection that is also long-lived and may be set up under the guidance of a service team specifically to allow errors to be reported. For example, the third connection 143 may be a short-lived connection that may be obtained when the error notification message is being sent and can be used to send unsolicited messages to a remote system via another network.

Figure 2:
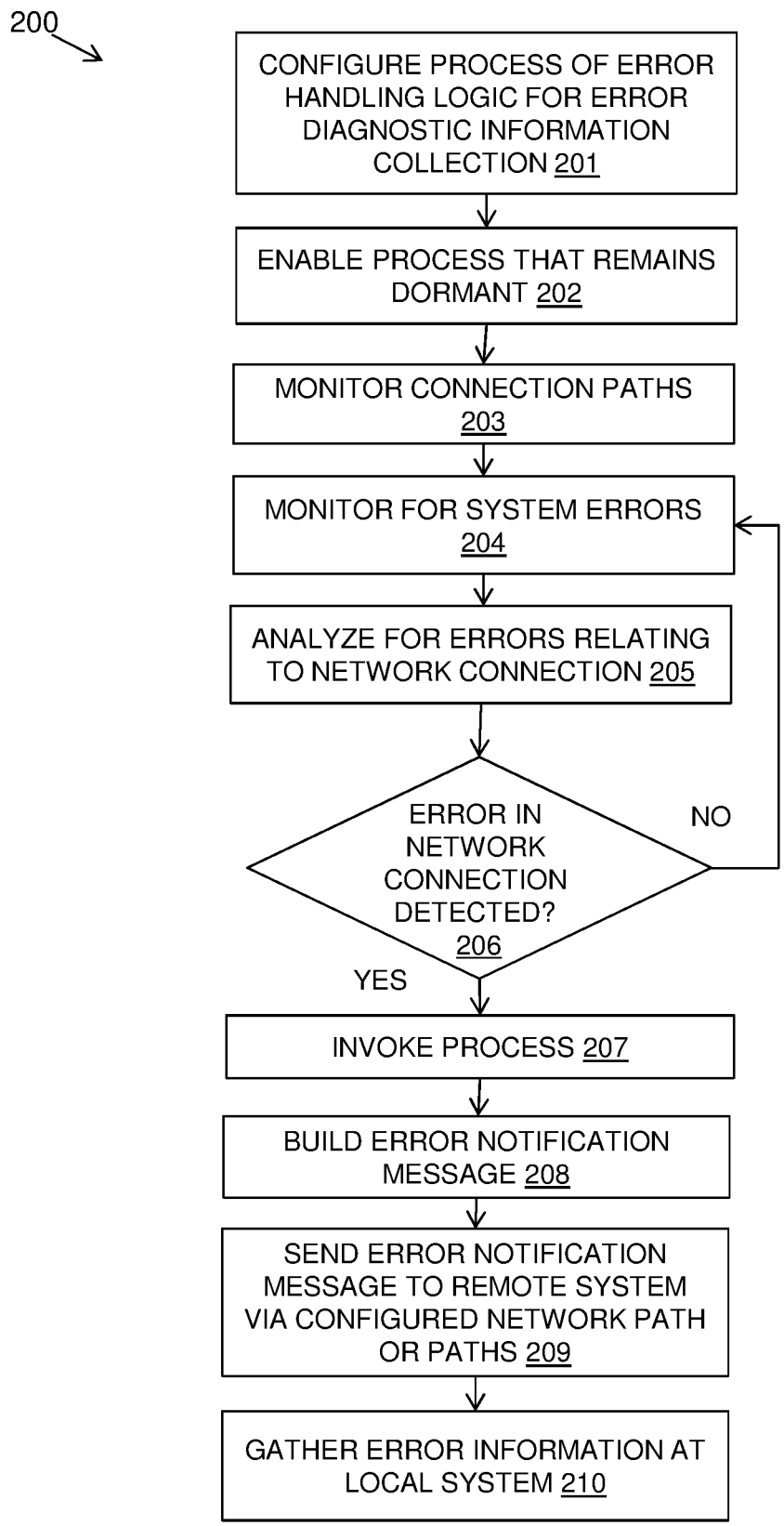
FIG. 2 is a flow diagram of an example embodiment of a first aspect of a method in accordance with the present invention.

Referring to FIG. 2, a flow diagram 200 shows an example embodiment of an aspect of the described method as carried out by a first software system that identifies an error and instigates the error diagnostic information collection.

An existing or new error handling logic may be configured 201 to include the described functionality for a process for notifying a partner software system of an error in order to collect error diagnostic information at the partner software system. The configuration may include the types of errors for which the process is activated to collect diagnostic information, the network connections available, and rules for selection and use of the network connections. For example, the configuration may allow the software system to respond to specific errors relating to individual or sets of network connections that it makes use of.

Once the process is configured, it may be enabled 202 and may remain dormant until the system detects an error that the process is configured to react to. Connection paths of the software system may be monitored 203 and identified. Monitoring the one or more network connections may monitors and identify the error notification paths available for selection from the configuration.

Errors at the software system may be monitored 204 whilst the software system carries out its normal operations. The errors may be analyzed 205 to determine that the cause is related to a communication failure of a network connection.

The errors may be server errors relating to a network connection. A server error may be anything that prevents the local system from sending or receiving messages over the network connection. The error monitoring may monitor message transmission failure or non-receipt of an acknowledgement from partner software system of the interconnected system due to an error in a network connection.

It may be determined 206 if a network connection error is detected. For example, this may be by identifying a message transmission failure or non-receipt of an acknowledgement from a partner software system due to an error or fault in a network connection. If no error has been detected, the method may continue monitoring 204 for errors. Once the system detects a network connection error, it then invokes 207 the process to notify a partner software system. The software system detecting the error may gather 210 its own error information at the local software system.

The software system detecting the error may invoke 207 the process to notify the partner software system before or in parallel with gathering 210 its own diagnostic information as diagnostic collection can take some time to complete and it is desirable to start the process of the partner software system gathering its own diagnostic information as close to the point where the error occurs as possible.

The method attempts to request that its partner software system immediately collects diagnostic information for the error. This is carried out by building 208 an error notification message. The error notification message may include details of the error and the diagnostic information required to be gathered by the partner software system. Alternatively, the partner software system may determine what diagnostic information it gathers. The two software systems may be different software products that share a common network protocol and, therefore, the first software system may not know what data the partner software system has available to it.

The error notification message may be sent 209 to the remote partner software system via one or more network connection paths as configured in the notification process. The configuration may provide rules as to which network connection paths to attempt and in which order.

In one configuration of a connection path selection, the method may attempt to send the message initially over the current connection because this potentially is the most efficient transport to use and, if this fails, then it tries over a different path through the same network, and if that fails then it attempts to use a different network connection.

In another example configuration, the process may be configured to respond to a server error with a network connection by making use of a specified network address.

This configuration information is persisted by the process for the lifetime of the software system or until it is reconfigured.

Figure 3:
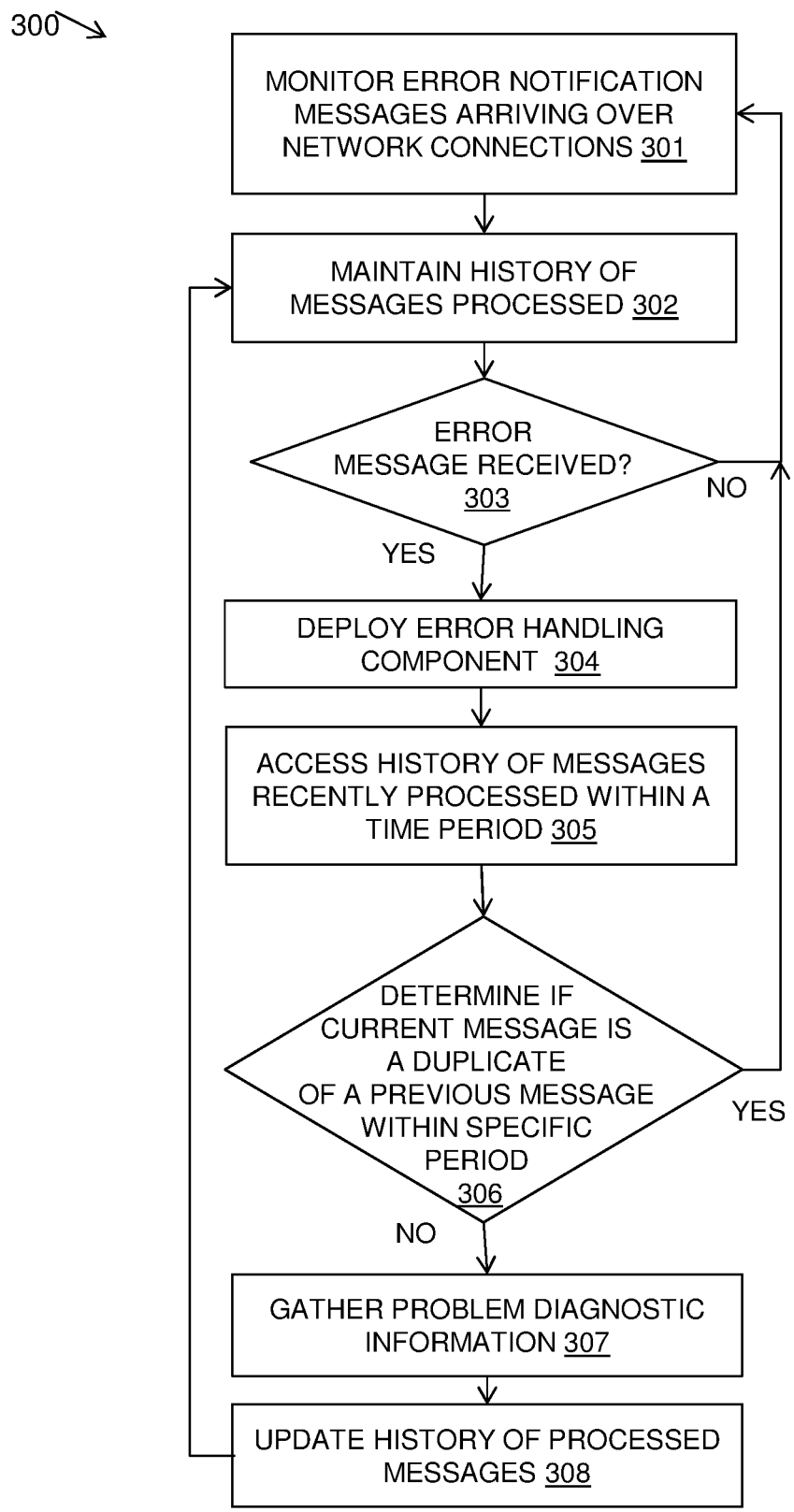
FIG. 3 is a flow diagram of an example embodiment of a second aspect of a method in accordance with the present invention.

Referring to FIG. 3, a flow diagram 300 shows an example embodiment of an aspect of the described method deployed in a remote software system. The method may monitor 301 error notification messages arriving over network connections from its connected software systems. The software system may maintain 302 a history of received error notification messages that may be being processed or are already processed. The history may include the origin of the message and/or the network connection it was received on, and a timestamp of the message of its arrival or another recordable time point.

It may be determined 303 if an error notification message is received. If no error notification message has been received, the method loops to continue monitoring 301 for error notification messages. When an error notification message is received, an error handling component at the error receiving software system may be deployed 304.

The method may access 305 the history of processed messages of a specific period prior to the current message. The method may determine 306 if the current message is a duplicate of a previously received message in order to decide if the requested error diagnostic information needs to be gathered.

In one example embodiment, the duplication may be determined by comparing the origin of the current message with the origin of messages in the maintained history. In this way, messages may be identified which are likely to be duplicates as they are from the same origin within a specified prior period.

The duplication may alternatively or additionally be determined by comparing the network connection on which the error notification message is received. An implementation of this mechanism is one that records each of the network connections an error notification message is received on and then marks them with a timestamp when error diagnostic information is collected.

For example, the history of processed messages may be maintained in the form of a data structure with flags representing network connections. A flag, which typically is a bit, may then be set to 1 when an error notification message is received for the network connection. The flag may be reset to 0 after a specified time period by a long running process.

The specified time period may be configured such that the method recognizes duplicates of the same error, whilst still identifying repeated errors that reoccur once they have been remedied. The timestamp can then be used to prevent multiple sets of data being gathered within a specific period, for instance, within the last hour.

If it is determined that the error notification message is a new message, the diagnostic information may be gathered 307. The remote software system may collect and process the diagnostic data as if the error had been detected locally. The history of the processed messages may then be updated 308.

An example of the method carried out at the error notifying system is described in the context of the example system described in relation to FIG. 1.

Software system A 110 is configured with a connection error notifying component 115. Software system B 120 includes a connection error handler component 125. In this example scenario, the software system A 110 and the software system B 120 have a first connection 141 in the form of a long-lived Transmission Control Protocol/Internet Protocol (TCP/IP) connection that makes use of two separate sockets. A second connection 142 between the systems 110, 120 is a System Network Architecture (SNA) connection that is also long-lived. A third connection 143 between the systems 110, 120 is a short-lived connection that can be used to send unsolicited messages to a remote system via another network.

Software system A 110 may detect an error and may go into its error handling routine. This routine recognizes this is a communications error with the first connection 141 and prepares a message telling software system B 120 what diagnostics it needs to also collect. The routine determines from its configuration which paths to use to send the message over.

In this example, software system A 110 tries to send the message down the first connection 141 as it is currently using this connection. If this transmission fails or an acknowledgement is not returned in a given time period, then it attempts to use an alternative path in the first connection 141.

If the message still cannot be sent or no acknowledgement is received, then it tries using the second connection 142. If this also fails, which might be, for example, because the connection is not open, then it tries the third connection 143.

Irrespective of whether any of the above has worked or not, the software system A 110 gathers its error diagnostic information.

In another example scenario, software system A 110 may be configured to immediately use the third connection 143 when it detects an error with the first connection 141.

Software system B 120 is configured to recognize the arrival of notifications for error capture processing via any/all of the entry points from software system A 110.

Figure 4:
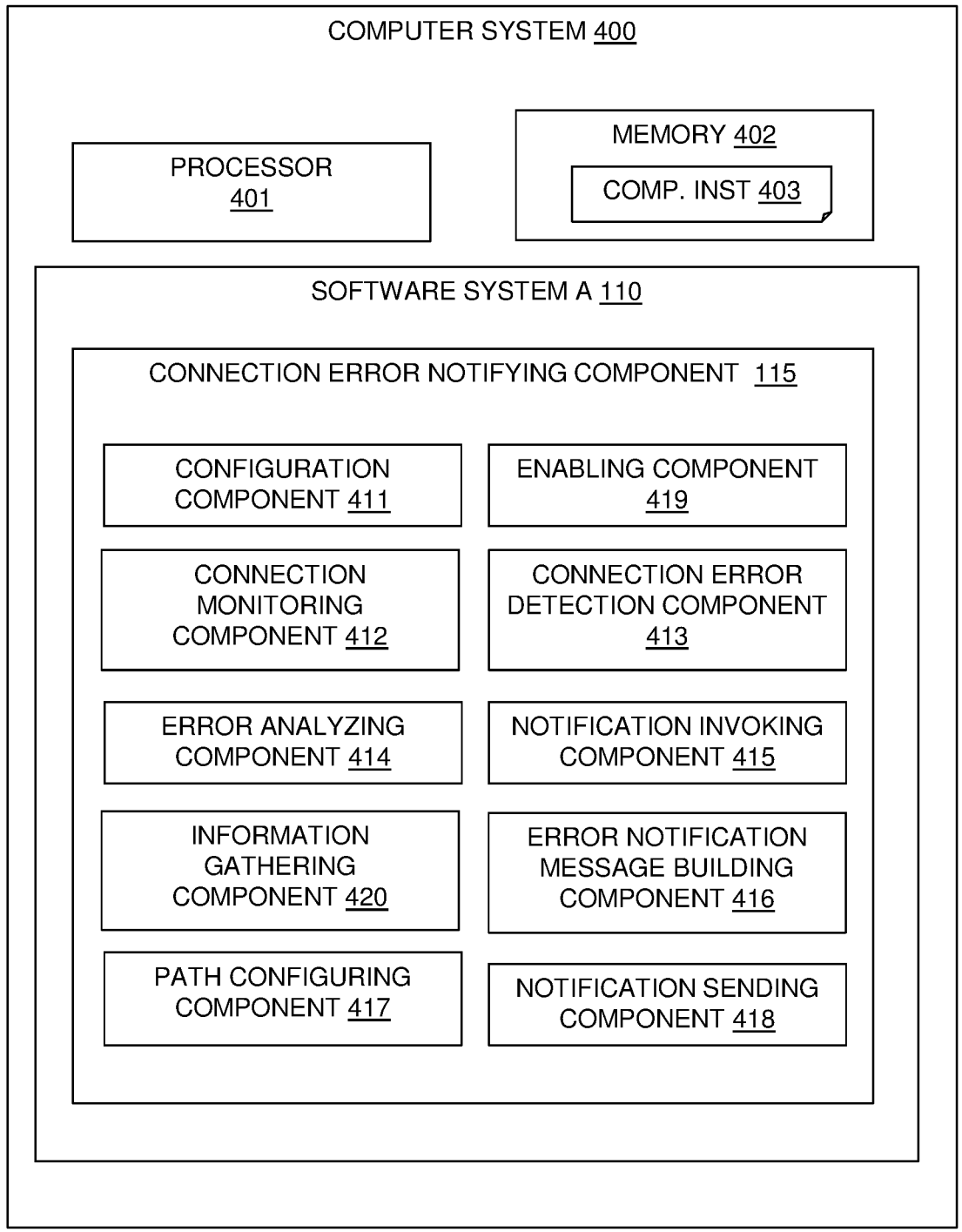
FIG. 4 is block diagram of an example embodiment of a first aspect of a system in accordance with the present invention.

FIG. 4 is a block diagram of a computer system 400 having a software system 110 executing on it and including an example embodiment of a connection error notifying component 115.

The computer system 400 may include at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the described components.

The connection error notification component 115 may include a configuration component 411 for configuration of a selection of one or more error notification paths. The connection error notification component 115 may include an enabling component 419 for enabling the connection error notification component 115 such that it remains dormant and has a connection monitoring component 412 for monitoring one or more network connections.

The connection error notification component 115 may include a connection error detection component 413 for detecting an error in a network connection and a notification invoking component 415 for invoking further operation of the connection error notification component 115.

The connection error notification component 115 may include a connection monitoring component 412 for monitoring an error at the software system and an error analyzing component 414 for analyzing the error to determine if it relates to a network connection. The connection monitoring component 115 may also monitor the one or more network connections and may identify the error notification paths available for selection from the configuration.

The connection error notification component 115 may include an information gathering component 420 for gathering information and an error notification message building component 416 for building an error notification message. The error notification message building component 416 for building an error notification message may include an identification of an error for which diagnostic information is to be gathered by the remote software system and, optionally, information as to the diagnostic information to be gathered by the remote software system.

The connection error notification component 115 may include a notification sending component 418 for sending the error notification message to a remote software system at the end of the network connection on which the error is detected via one or more error notification paths selected by a path configuring component 417 according to the configuration.

Figure 5:
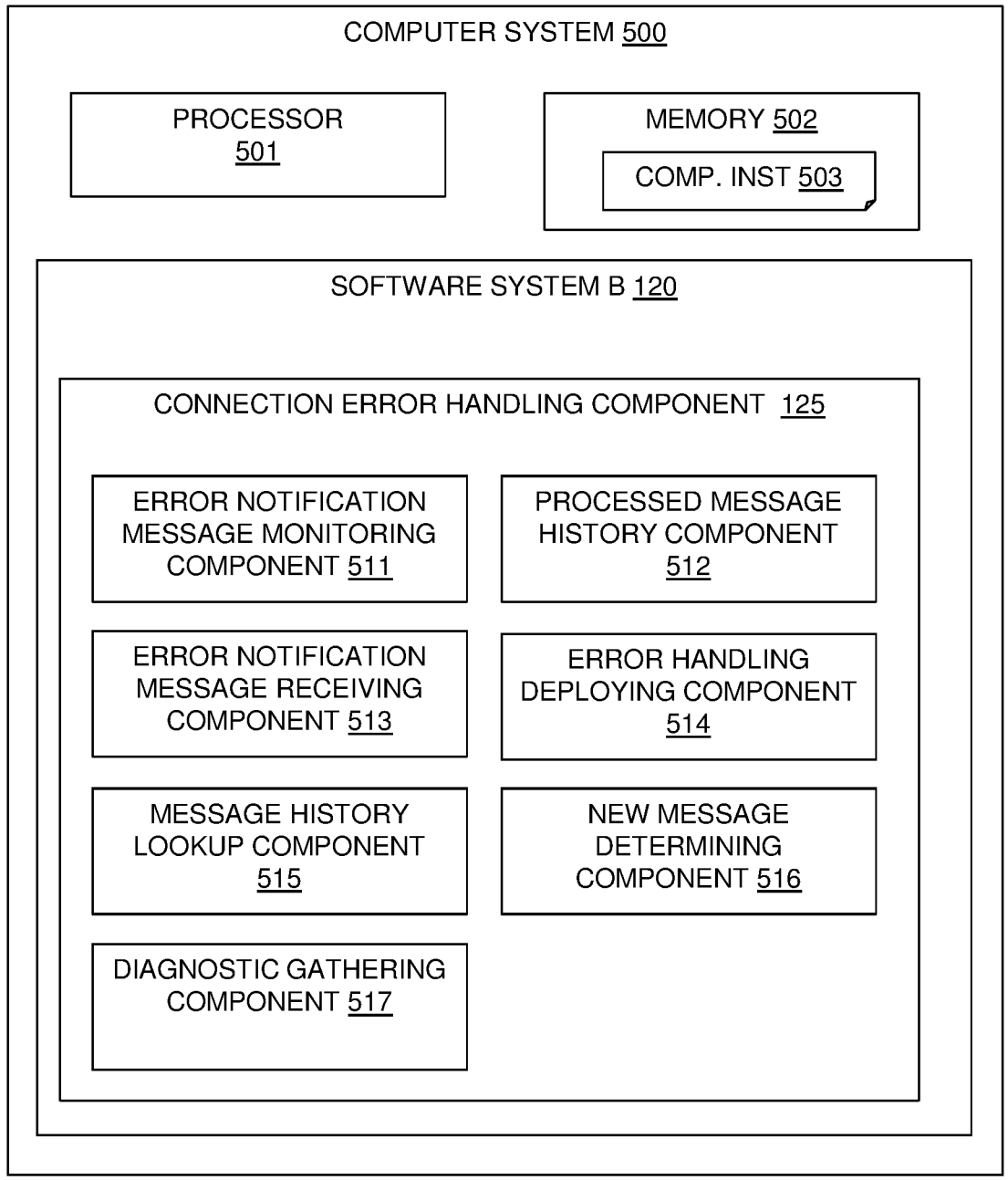
FIG. 5 is block diagram of an example embodiment of a second aspect of a system in accordance with the present invention.

FIG. 5 is a block diagram of a computer system 500 having a software system B 120 executing on it and including an example embodiment of a connection error handling component 125.

The computer system 500 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the described components.

The connection error handling component 125 may include an error notification message receiving component 513 and an error notification message monitoring component 511 for monitoring error notification messages arriving over one or more network connections from a remote software system.

The connection error handling component 125 may include a processed message history component 512 for maintaining a history of processed error notification messages for comparison to a currently received error notification message. In one embodiment, the processed message history component 512 may record a timestamp of the time of arrival of an error notification message, and an origin of an error notification message or a network connection on which an error notification message has been received. In another embodiment, the processed message history component 512 may be a data structure with flags used to represent network connections.

The connection error handling component 125 may include a new message determining component 516 for determining if a current error notification message is a duplicate of a previously received error notification message in a predefined time period and a message history lookup component 515 for looking up a stored processed message history.

The connection error handling component 125 may include an error handling deploying component 514 for deploying the error handling if a current message is not a duplicate message. The connection error handling component 125 may include a diagnostic gathering component 517 for gathering problem diagnostic information, if a current message is not a duplicate.

Figure 6:
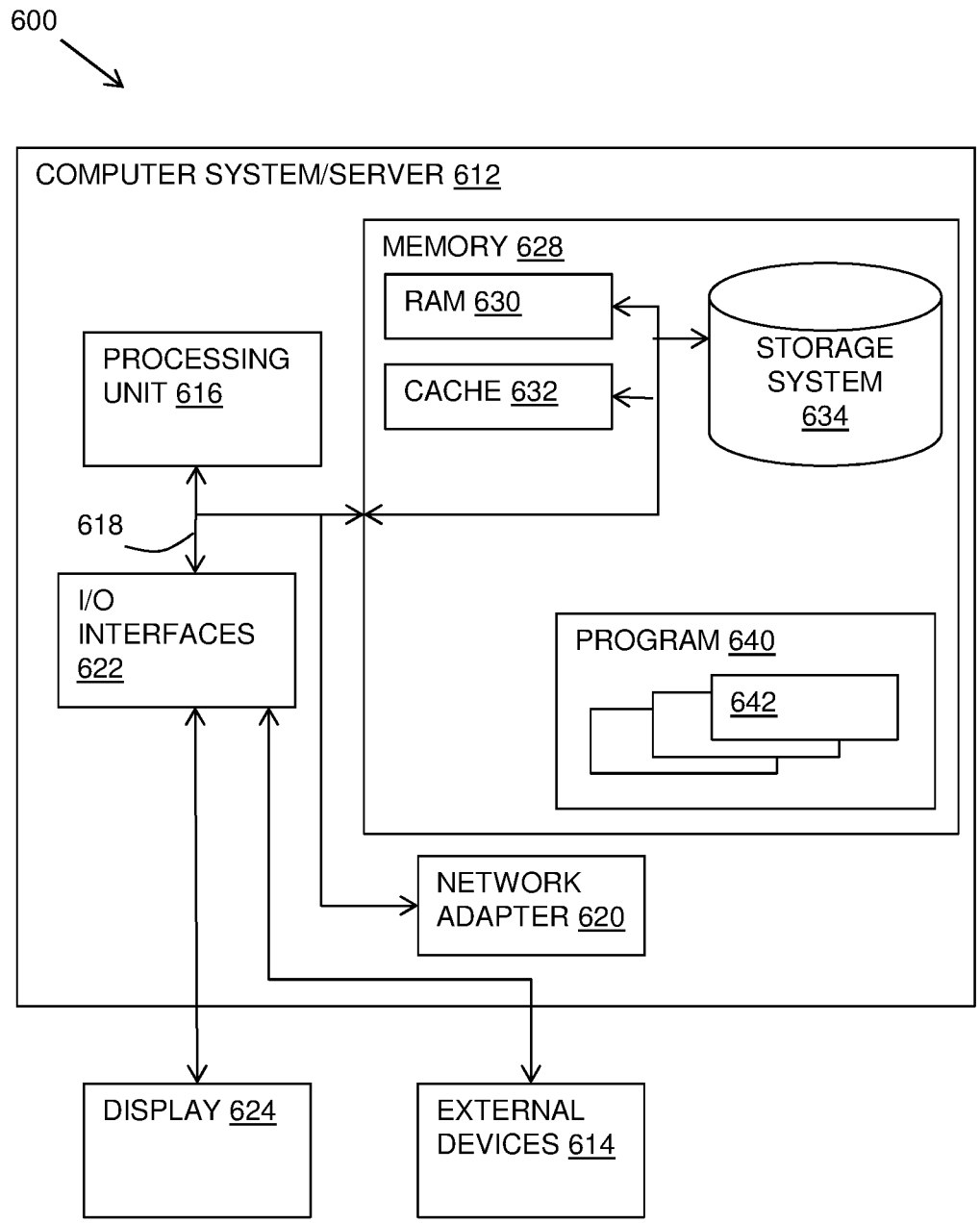
FIG. 6 is a block diagram of an embodiment of a computer system or cloud server in which the present invention may be implemented.

Referring now to FIG. 6, a schematic of an example of a system 600 in the form of a computer system or server is shown.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
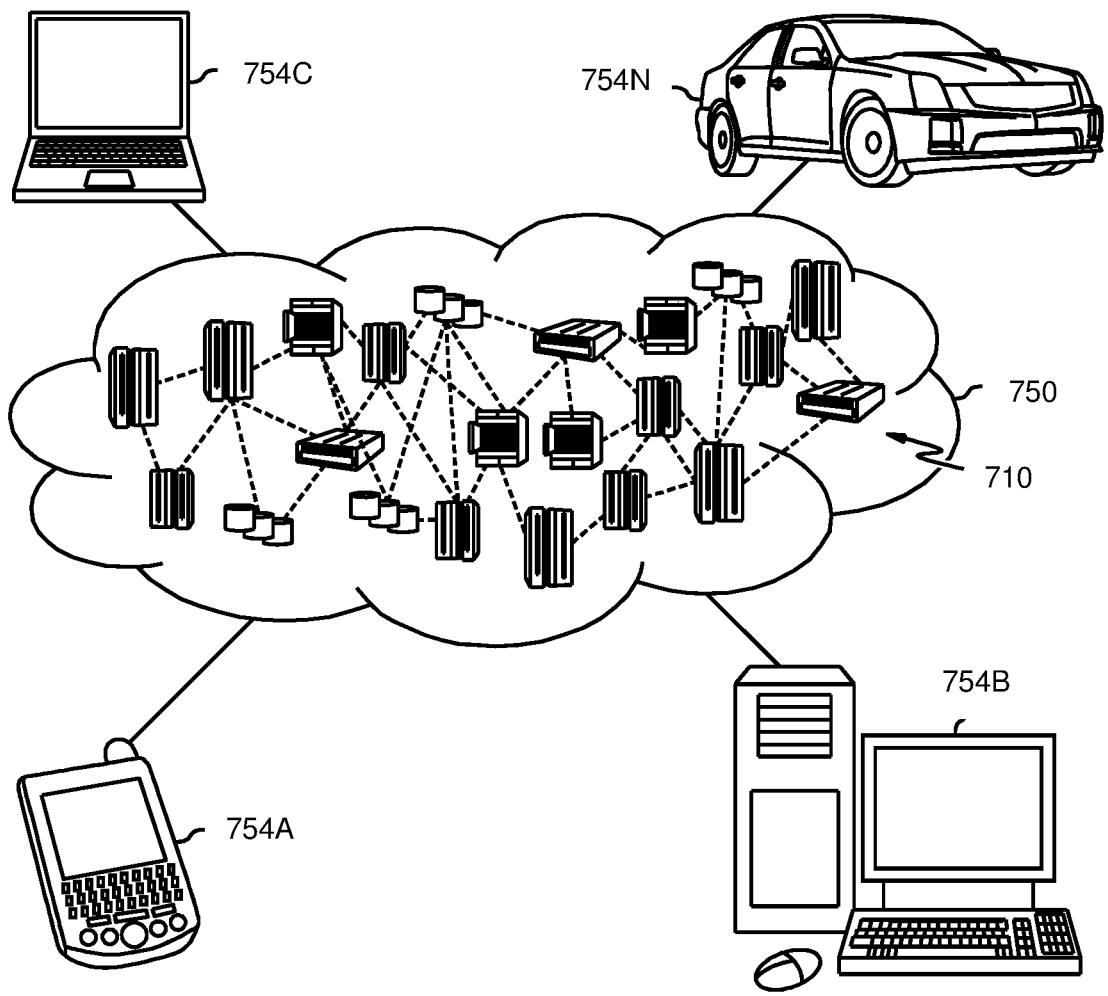
FIG. 7 is a schematic diagram of a cloud computing environment in which the present invention may be implemented.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
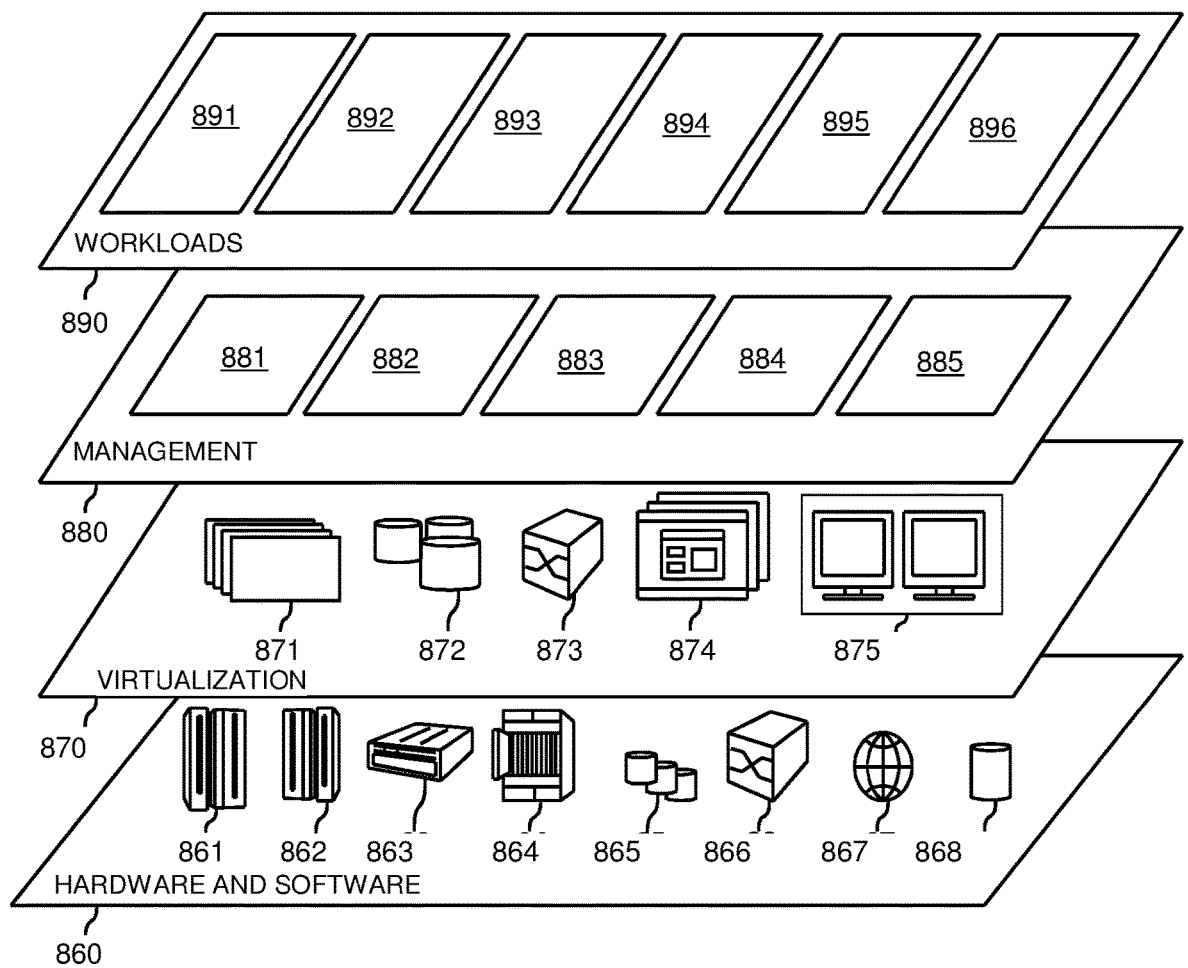
FIG. 8 is a diagram of abstraction model layers of a cloud computing environment in which the present invention may be implemented.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and error notification and error handling processing 896.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for notification of network connection errors between connected software systems, comprising:
   providing an error notification process for a local software system that uses a plurality of network connections to interact with a remote software system, wherein the error notification process includes a configuration of a plurality of error notification paths;
   enabling a dormant error notification process that monitors the plurality of network connections between the local software system and the remote software system to identify at least one of the plurality of error notification paths available for selection from the configuration, wherein said monitoring occurs while the local software system is interacting with the remote software system; and
   detecting an error in a network connection and invoking the dormant error notification process, including:
   building an error notification message; and
   sending the error notification message to the remote software system at an end of the network connection on which the error is detected via one of the plurality of error notification paths selected according to the configuration.

2. The method as claimed in claim 1, including gathering diagnostic information relating to the error at the local software system in parallel with sending the error notification message.

3. The method as claimed in claim 1, including monitoring an error at the local software system and analyzing the error to determine if it relates to a network connection.

4. The method as claimed in claim 1, wherein the configuration of the selection of the plurality of error notification path selection includes configuring an order in which different paths on a single network connection or different network connections are used.

5. The method as claimed in claim 1, including providing an error handling process including:
   monitoring error notification messages arriving over the plurality of network connections from a remote software system;
   determining if a current error notification message is a duplicate of a previously received error notification message in a predefined time period; and
   gathering problem diagnostic information if a current message is not a duplicate.

6. The method as claimed in claim 5, wherein the error handling process includes:
   maintaining a history of processed error notification messages for comparison to a currently received error notification message in a defined time period.

7. The method as claimed in claim 6, wherein maintaining a history of processed error notification messages includes using flags in a data structure representing network connections and setting a flag when an error notification message is received for a network connection.

8. The method as claimed in claim 6, wherein maintaining a history of processed error notification messages includes:
   recording a timestamp of a time of arrival of an error notification message;
   recording an origin of an error notification message or a network connection on which an error notification message has been received; and
   using the origin or network connection when determining if a current error notification message is a duplicate of a previously received error notification message.

9. A system for path determination for notification of network connection errors between connected software systems, comprising:
   a processor and a memory configured to provide computer program instructions to the processor to execute instructions;
   an connection error notification component for a local software system that uses a plurality of network connections to interact with a remote software system, wherein the connection error notification component includes a configuration component for configuration of a plurality of error notification paths;
   an enabling component for enabling a dormant connection error notification component and has a connection monitoring component for monitoring the plurality of network connections between the local software system and the remote software system to identify at least one of the plurality of error notification paths available for selection from the configuration, wherein said monitoring occurs while the local software system is interacting with the remote software system; and a connection error detection component for detecting an error in a network connection and a notification invoking component for invoking further operation of the dormant connection error notification component, including:
 an error notification message building component for building an error notification message; and
 a notification sending component for sending the error notification message to the remote software system at an end of the network connection on which the error is detected via one of the plurality of error notification paths selected by a path configuring component according to the configuration.

10. The system as claimed in claim 9, including an information gathering component for gathering diagnostic information relating to the error at the local software system.

11. The system as claimed in claim 9, including a connection monitoring component for monitoring an error at the local software system and an error analyzing component for analyzing the error to determine if it relates to a network connection.

12. The system as claimed in claim 9, wherein the configuration component for configuration of error notification path selection includes configuring an order in which different paths on a single network connection or different network connections are used.

13. The system as claimed in claim 9, including a connection error handling component including:
 an error notification message monitoring component for monitoring error notification messages arriving over the plurality of network connections from a remote software system;
 a new message determining component for determining if a current error notification message is a duplicate of a previously received error notification message in a predefined time period; and
 a diagnostic gathering component for gathering problem diagnostic information if a current message is not a duplicate.

14. The system as claimed in claim 13, wherein the connection error handling component includes:
 a processed message history component for maintaining a history of processed error notification messages for comparison to a currently received error notification message in a defined time period.

15. The system as claimed in claim 14, wherein the processed message history component uses flags in a data structure representing network connections and sets a flag when an error notification message is received for a network connection.

16. The system as claimed in claim 14, wherein the processed message history component for maintaining a history of processed error notification messages includes:
 recording a timestamp of a time of arrival of an error notification message;
 recording an origin of an error notification message or a network connection on which an error notification message has been received; and
 using the origin or network connection when determining if a current error notification message is a duplicate of a previously received error notification message.

17. A computer program product for path determination for notification of network connection errors between connected software systems, the computer program product comprising a computer readable storage medium having program instructions embodied therewith, the program instructions executed by a processor to cause the processor to:
 provide an error notification process for a local software system that uses a plurality of more network connections to interact with a remote software system, wherein the error notification process includes a configuration of a plurality of error notification paths;
 enable a dormant error notification process and monitors the plurality of network connections between the local software system and the remote software system to identify at least one of the plurality of error notification paths available for selection from the configuration, wherein said monitoring occurs while the local software system is interacting with the remote software system; and
 detect an error in a network connection and invoking the dormant error notification process, including:
  building an error notification message; and
  sending the error notification message to the remote software system at an end of the network connection on which the error is detected via one of the plurality of error notification paths selected according to the configuration.

18. The computer program product as claimed in claim 17, including causing the processor to:
 provide an error handling process including:
 monitoring error notification messages arriving over the plurality of network connections from a remote software system;
 determining if a current error notification message is a duplicate of a previously received error notification message in a predefined time period; and
 gathering problem diagnostic information if a current message is not a duplicate.

* * * * *